United States Patent [19]

Nakao

[11] Patent Number: 5,787,295
[45] Date of Patent: Jul. 28, 1998

US005787295A

[54] DOCUMENT PROCESSING APPARATUS

[75] Inventor: Hisayasu Nakao, Kawasaki, Japan

[73] Assignee: Fujitsu Limited, Kawasaki, Japan

[21] Appl. No.: 744,654

[22] Filed: Nov. 6, 1996

Related U.S. Application Data

[63] Continuation of Ser. No. 113,924, Aug. 31, 1993, abandoned.

[30] Foreign Application Priority Data

Feb. 3, 1993 [JP] Japan ................................. 5-016163

[51] Int. Cl.$^6$ .................................................. G06F 17/21
[52] U.S. Cl. .................................. 395/761; 395/773
[58] Field of Search .................................. 395/761, 762, 395/773, 774, 792, 793, 799, 348, 349, 350; 345/156–184

[56] References Cited

U.S. PATENT DOCUMENTS

| | | | |
|---|---|---|---|
| 5,146,552 | 9/1992 | Cassorla et al. | 395/145 |
| 5,157,783 | 10/1992 | Anderson et al. | 395/600 |
| 5,199,104 | 3/1993 | Hirayama | 395/145 |
| 5,283,864 | 2/1994 | Knowlton | 395/158 |
| 5,341,293 | 8/1994 | Vertelney et al. | 364/419.17 |
| 5,463,725 | 10/1995 | Henckel et al. | 395/155 |
| 5,506,951 | 4/1996 | Ishikawa | 395/774 X |
| 5,510,808 | 4/1996 | Cina, Jr. et al. | 345/123 |
| 5,524,201 | 6/1996 | Shwarts et al. | 395/326 |

OTHER PUBLICATIONS

Olsen, Jr., Don R.; "Bookmarks: An Enhanced Scroll Bar"; *ACM Transactions on Graphics*; Jul. 1992; v11, No. 3; pp. 291–295.

Primary Examiner—Joseph H. Feild
Attorney, Agent, or Firm—Staas & Halsey

[57] ABSTRACT

A document processing apparatus to affix an identification mark (i.e., bookmark) to document information including character data, image data, etc. When an add command to affix an identification mark to a desired information location in the document information displayed on a display device is received from a command entry device, an identification mark affixing device causes a storage device to store an information location (i.e., a line in a page of the document information) to which the identification mark is to be affixed, as identification mark information. When a select command is received from the command entry device, to select a desired one of identification marks displayed on the display device, an identification mark searching device searches the identification mark information for the information location corresponding to the selected identification mark. When supplied with the add command or the select command, a display control device displays a portion of the document information to which the identification mark is affixed, at a particular position on the screen of the display device, together with the identification mark on a single screen. When a delete command to delete a desired one of the affixed identification marks is received, an identification mark deleting device deletes the information location corresponding to the identification mark to be deleted from the identification mark information.

13 Claims, 9 Drawing Sheets

DOCUMENT PROCESSING APPARATUS

This application is a continuation of application Ser. No. 08/113,924, filed Aug. 31, 1993, now abandoned.

BACKGROUND OF THE INVENTION

(1) Field of the Invention

The present invention relates to a document processing apparatus for processing (e.g., displaying) document information including character data, image data, etc., and more particularly, to a document processing apparatus capable of affixing an identification mark (bookmark) to document information.

(2) Description of the Related Art

When reading a book or a magazine, a reader often uses a tag to indicate an important passage or the like, or puts a bookmark to indicate the place to resume reading the next time.

With the recent development of electronic device-related technology, document information contained in books, such as sentences, figures and photographs, is to be packaged into compact disks called "CD-ROMs" or "Electronic Books." The document information contained in a compact disk can be displayed on a display device of a document processing apparatus or the like equipped with a compact disk drive unit (hereinafter merely referred to as "CD drive"), thus allowing the operator to read the sentences or view the figures stored in the disk.

Figure 1:
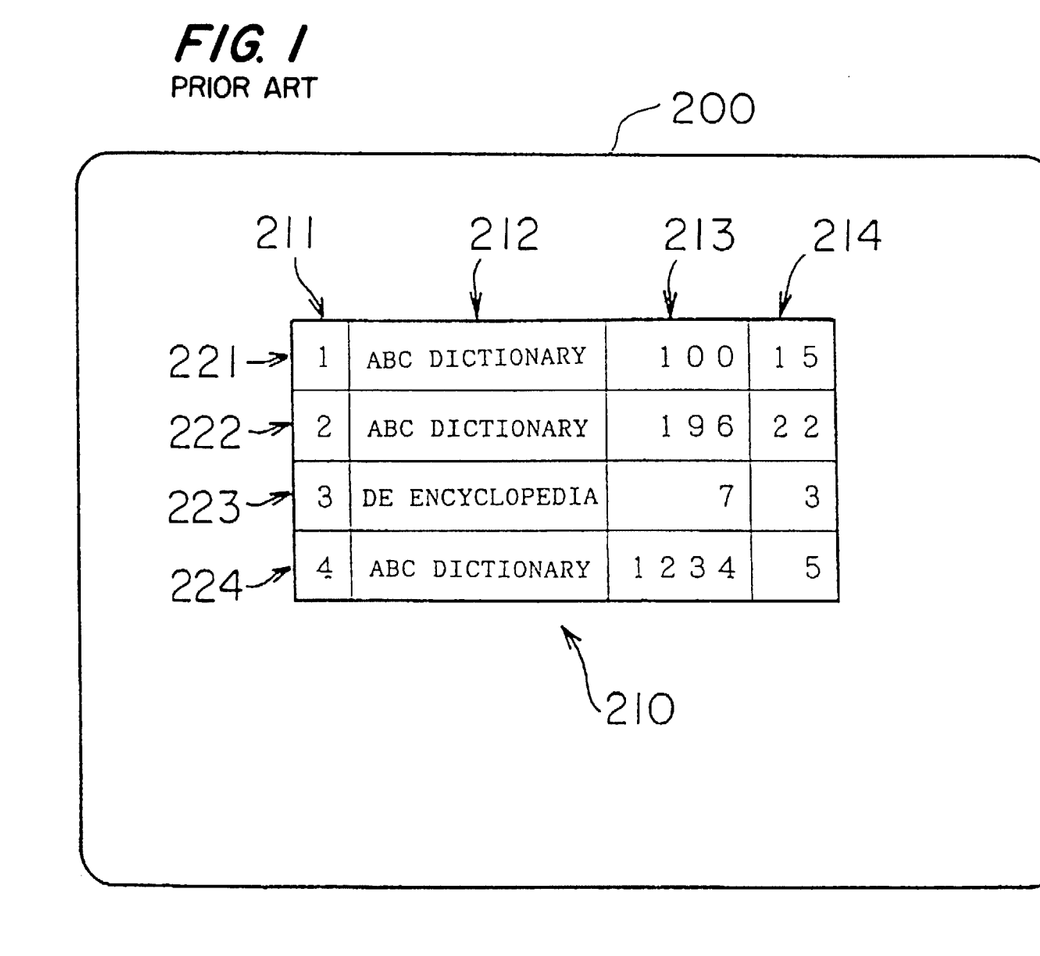
FIG. 1 (PRIOR ART) is a view showing an example of a screen displayed on a display device of a conventional document processing apparatus.

FIG. 1 shows an example of a screen displayed on a display device of a conventional document processing apparatus. As illustrated, a window of a tag jump table 210 is displayed at approximately the center of a display screen 200. The tag jump table 210 can be displayed through a predetermined operation of the document processing apparatus by the operator.

The tag jump table 210 shows a list of locations in document information (hereinafter merely referred to as "information locations") at each of which the operator has affixed a tag till then through a predetermined operation. Specifically, column 211 indicates item numbers, column 212 indicates names of document information sources to which the tags have been attached, and columns 213 and 214 indicate page numbers and line numbers, respectively, which individually specify the information location in the document information concerned. Accordingly, row 221 in FIG. 1, for example, indicates that a tag is affixed to page 100, line 15 of "ABC Dictionary" as the item number "1."

Viewing the tag jump table 210 thus displayed, the operator inputs an item number to the document processing apparatus, whereby a portion of the document information corresponding to the tag-affixed information location is displayed at the display device. For example, if the item number "1" is entered, the document processing apparatus clears the tag jump table 210 displayed on the display device, and then displays the document information in such a manner that line 15 on page 100 of the "ABC Dictionary" is located at approximately the center of the display screen 200.

In the conventional display device, however, since the screen displaying the document information differs from that displaying the tag jump table 210, it is not possible to visually confirm the tag-affixed location on the screen displaying the document information. Namely, the location in the document information at which the tag is attached cannot be identified at a glance.

Further, displaying a portion of the document information corresponding to the tag-affixed information location involves at least an operation to display the tag jump table 210, and selection and entry of an item in the table, thus requiring a cumbersome operation.

SUMMARY OF THE INVENTION

An object of the present invention is to provide a document processing apparatus which requires a simple operation to affix an identification mark (bookmark) visually to document information and which permits visual confirmation of the identification mark on a screen displaying the document information.

To achieve the above object, the present invention provides a document processing apparatus including a display device for displaying document information. The document processing apparatus is characterized by comprising command entry means for providing an add command to affix an identification mark to a desired information location in the document information displayed at the display device, and a select command to select a desired one of affixed identification marks, identification mark affixing means for causing storage means to store an information location at which the identification mark is to be affixed as identification mark information when supplied with the add command, identification mark searching means for searching the identification mark information for the information location corresponding to the selected identification mark when supplied with the select command, and display control means for displaying a portion of the document information to which the identification mark is affixed, at a particular position on the screen of the display device based on the information location to which the identification mark is to be affixed or the information location searched for, together with the identification mark on a single screen.

Preferably, the command entry means further provides a delete command to delete a desired one of the affixed identification marks, and the document processing apparatus further comprises identification mark deleting means for deleting an information location corresponding to the identification mark to be deleted, from the identification mark information when supplied with the delete command from the command entry means.

The above and other objects, features and advantages of the present invention will become apparent from the following description when taken in conjunction with the accompanying drawings which illustrate preferred embodiments of the present invention by w ay of example.

DETAILED DESCRIPTION OF THE PREFERRED EMBODIMENTS

First, an embodiment according to the present invention will be outlined.

Figure 2:
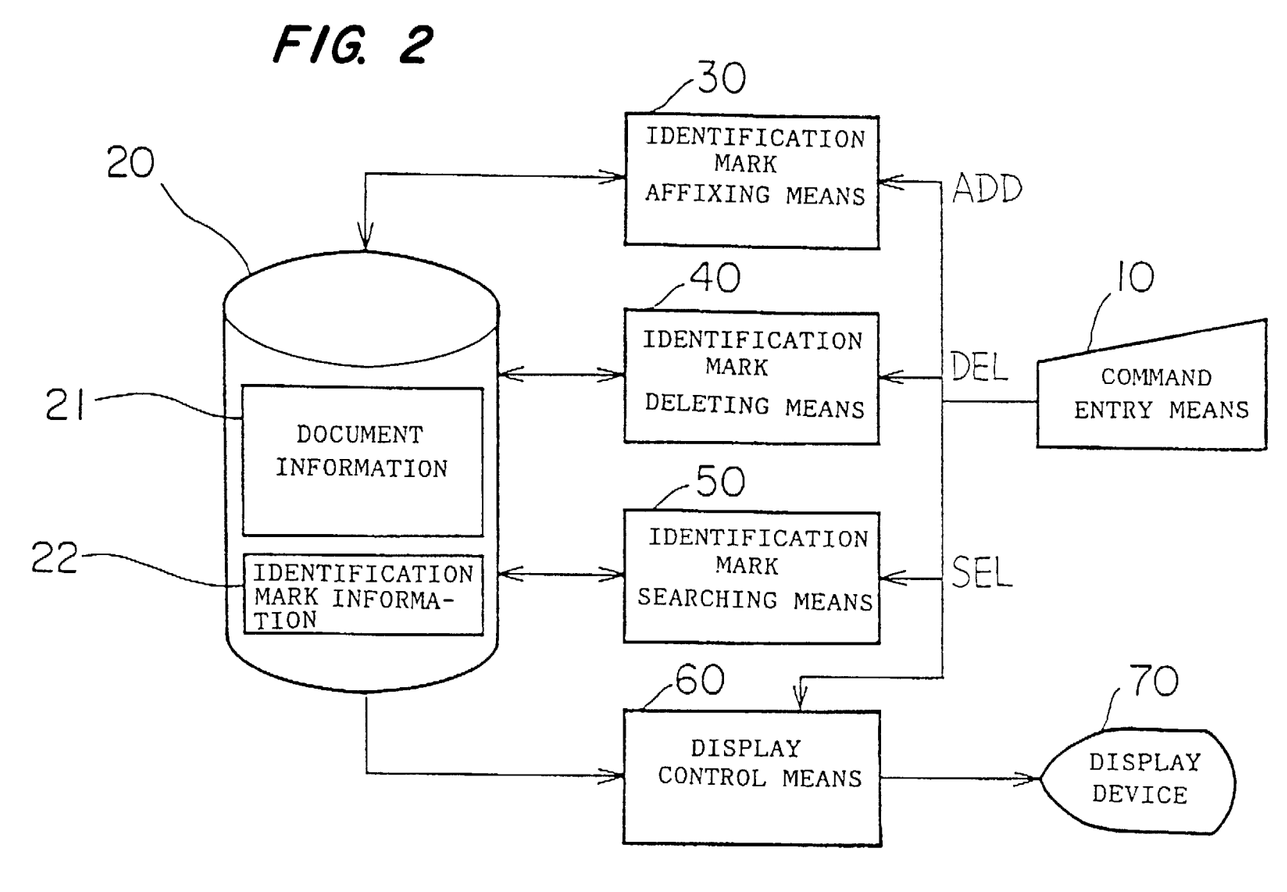
FIG. 2 is a diagram illustrating principles and configuration according to one embodiment of the present invention.

FIG. 2 illustrates the principles and configuration according to an embodiment of the invention. As illustrated, a document processing apparatus of the embodiment comprises various elements, which include command entry means 10, storage means 20, identification mark affixing means 30, identification mark deleting means 40, identification mark searching means 50, display control means 60, and a display device 70. The storage means 20 is composed of a compact disk storing document information 21, and a RAM 103 (described later) storing identification mark information 22.

As the command entry means 10, a pointing device such as a mouse is used. The command entry means 10 outputs an add command ADD to affix an identification mark to a desired information location in the document information 21 displayed on the display device 70, a delete command DEL to delete a desired one of the identification marks already affixed, and a select command SEL to select and specify a desired one of the already affixed identification marks.

On receiving the add command ADD output from the command entry means 10, the identification mark affixing means 30 supplies data representing the information location at which the identification mark is affixed, to the storage means 20 to be stored therein as the identification mark information 22. When the delete command DEL is received from the command entry means 10, the identification mark deleting means 40 deletes the information location data corresponding to the identification mark to be deleted, from the identification mark information 22. When the select command SEL is received from the command entry means 10, the identification mark searching means 50 searches the identification mark information 22 for the information location data corresponding to the selected identification mark.

When the add command ADD, delete command DEL or select command SEL is received, the display control means 60 displays both document information and identification mark on a single screen of the display device 70, based on the document information 21 and identification mark information 22 stored in the storage means 20.

The configuration described above requires only a simple operation to affix an identification mark visually to document information, just like putting a bookmark in an ordinary book, and to delete or select an identification mark.

The embodiment will be now described in detail.

Figure 3:
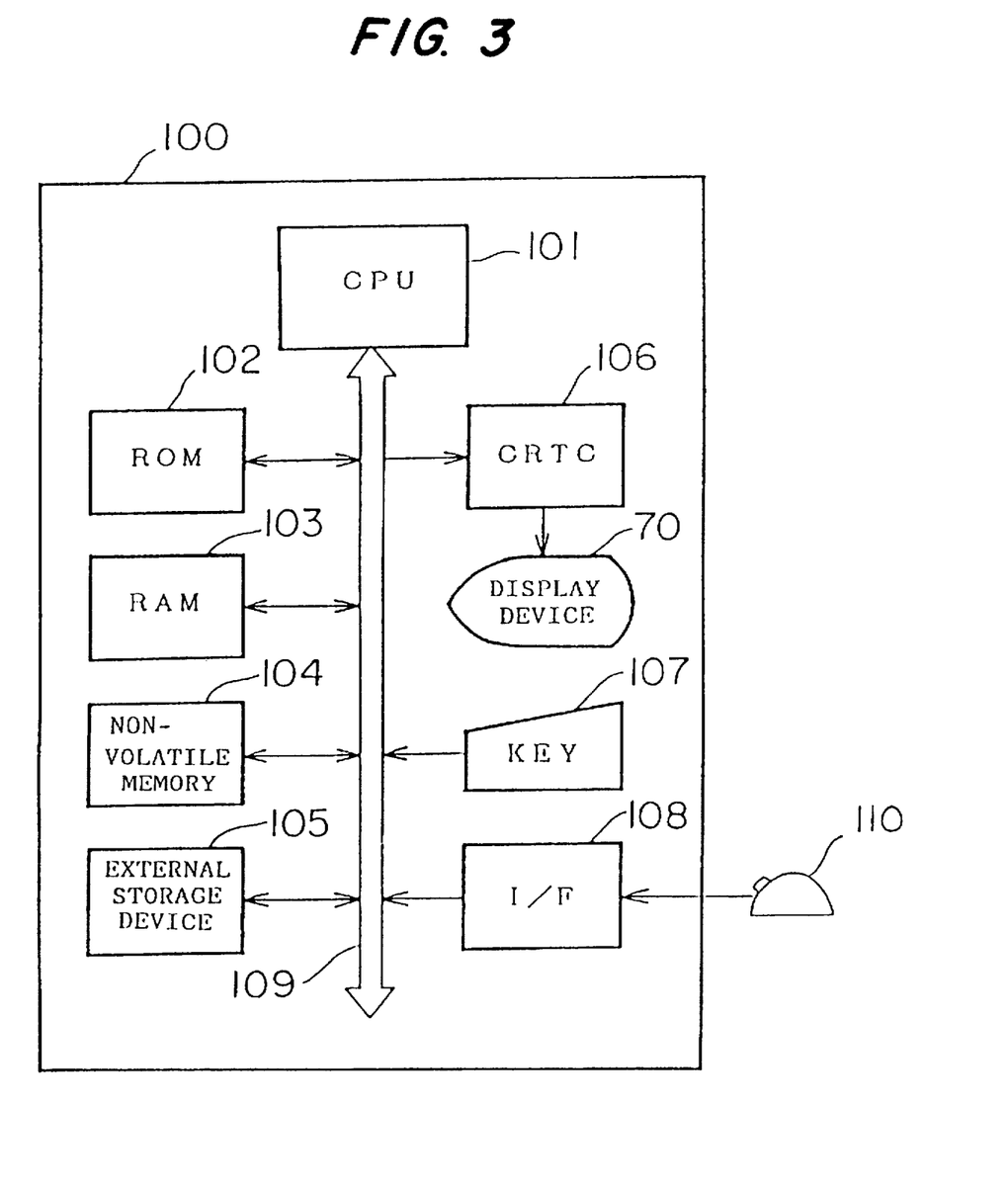
FIG. 3 is a block diagram illustrating the hardware arrangement of a document processing apparatus.

FIG. 3 is a block diagram illustrating the hardware arrangement of the document processing apparatus. The document processing apparatus 100 comprises various hardware components which include a processor (hereinafter referred to as "CPU") 101, a ROM 102, a RAM 103, a nonvolatile memory 104, an external storage device 105, a CRT control circuit 106, the aforementioned display device 70, an operator control panel (hereinafter referred to as "KEY") 107, and an interface 108.

The CPU 101 globally controls the document processing apparatus 100 in accordance with system programs stored in the ROM 102. An EPROM EEPROM or the like is used for the ROM 102.

The RAM 103 comprises a DRAM, for example, and stores the identification mark information 22 shown in FIG. 2, temporary data such as work data, and input/output signals. The nonvolatile memory 104 comprises a CMOS-RAM backed up by a battery (not shown), and stores important data that should be retained even after the power is cut off, such as system information. The external storage device 105 includes a CD drive for storing various data such as the document information 21 shown in FIG. 2.

The RAM 103 and the external storage device 105 correspond to the storage means 20 shown in FIG. 2. The functions of the identification mark affixing means 30, identification mark deleting means 40 and identification mark searching means 50, shown in FIG. 2, are accomplished by executing ones of the system programs stored in the ROM 102 by the CPU 101.

The CRT control circuit 106 corresponds to the display control means 60 in FIG. 2. The circuit 106 controls the screen display and converts digital signals into video signals, which are then supplied to the display device 70. The display device 70 comprises a CRT or liquid-crystal display device, and displays document data etc.

The KEY 107 comprises a keyboard through which document data etc. are entered. The interface 108 carries out interfacing control to convert the add command ADD, the delete command DEL and the select command SEL, supplied from a mouse 110 corresponding to the command entry means 10 in FIG. 2, into digital data and to transfer the converted data to the CPU 101. The KEY 107 may be designed to form part of the command entry means 10 in FIG. 2, so that the add command ADD, the delete command DEL and the select command SEL can be input from the KEY 107.

The aforementioned elements, except for the display device 70 and the mouse 110, are connected to a bus 109.

Figure 4:
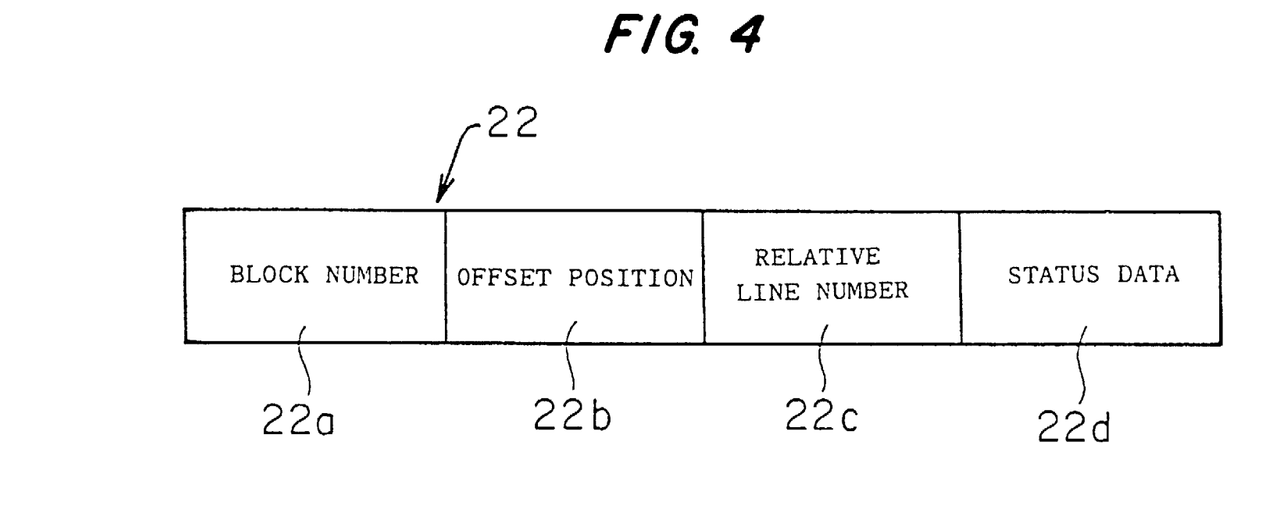
FIG. 4 is a diagram showing the structure of identification mark information.

FIG. 4 illustrates the structure of the identification mark information 22 stored in the RAM 103. The identification mark information 22 has a unit shown in FIG. 4, which unit is created every time the add command ADD is output and is composed of a block number 22a, an offset position 22b, a relative line number 22c, and status data 22d.

The block number 22a represents the number of a partition of the external storage device 105 in which the document information affixed with the identification mark is stored, among the document information 21 stored in the storage device 105.

The offset position 22b indicates an offset value which represents the head position of a page to which the identification mark is affixed, within the partition of the external storage device 105 specified by the block number 22a.

The relative line number 22c indicates the line number in the specified page to which the identification mark is attached.

The status data 22d is data necessary for the display control, such as data representing the screen status of the display device 70 at the time of generation of the add command ADD, select command SEL, etc.

The operation according to this embodiment will be now described with reference to FIGS. 5 through 8 which each illustrate a screen 71 displayed on the display device 70 of the document processing apparatus 100. In the following, it is assumed that the identification mark (hereinafter referred to as "bookmark") is displayed in the shape of a ribboned card and that up to three bookmarks can be used, for simplicity of explanation.

Figure 5:
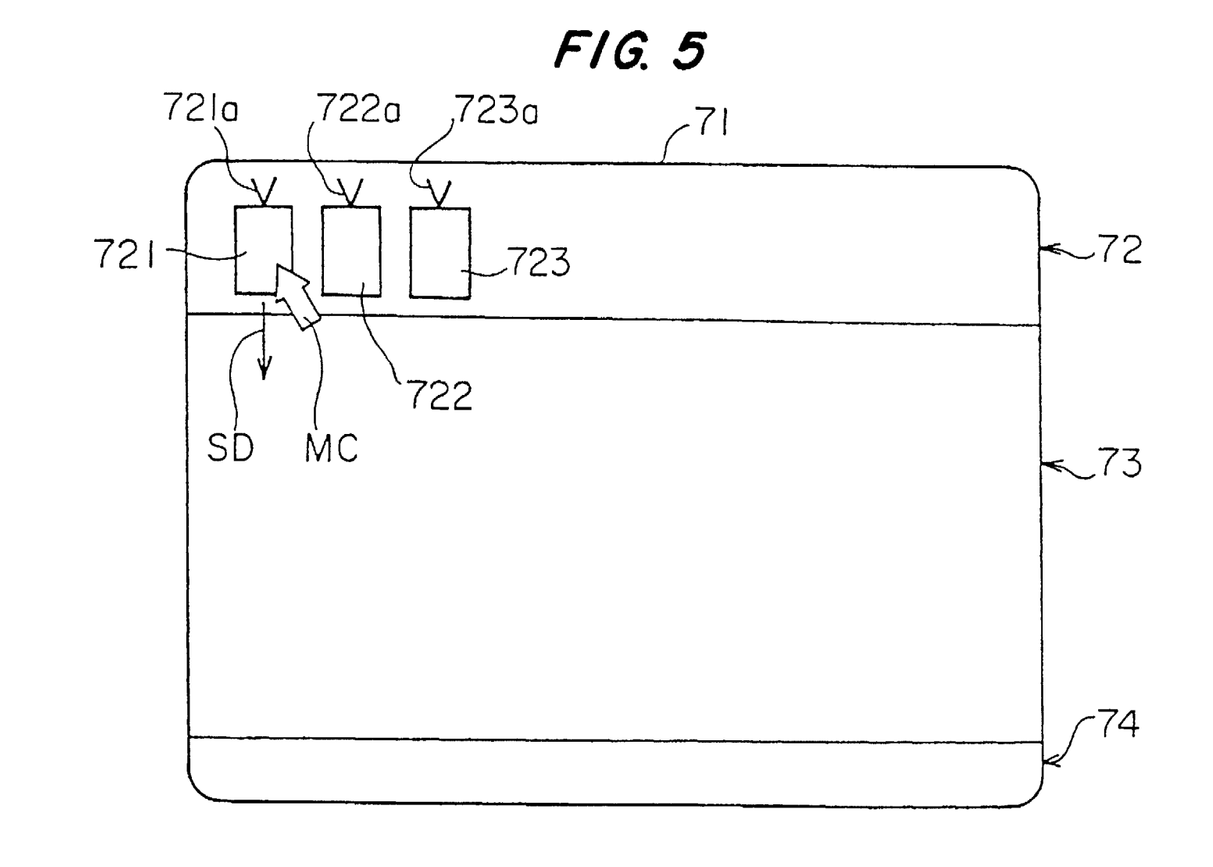
FIG. 5 is a view of a normal screen displaying contents of document information.
Figure 6:
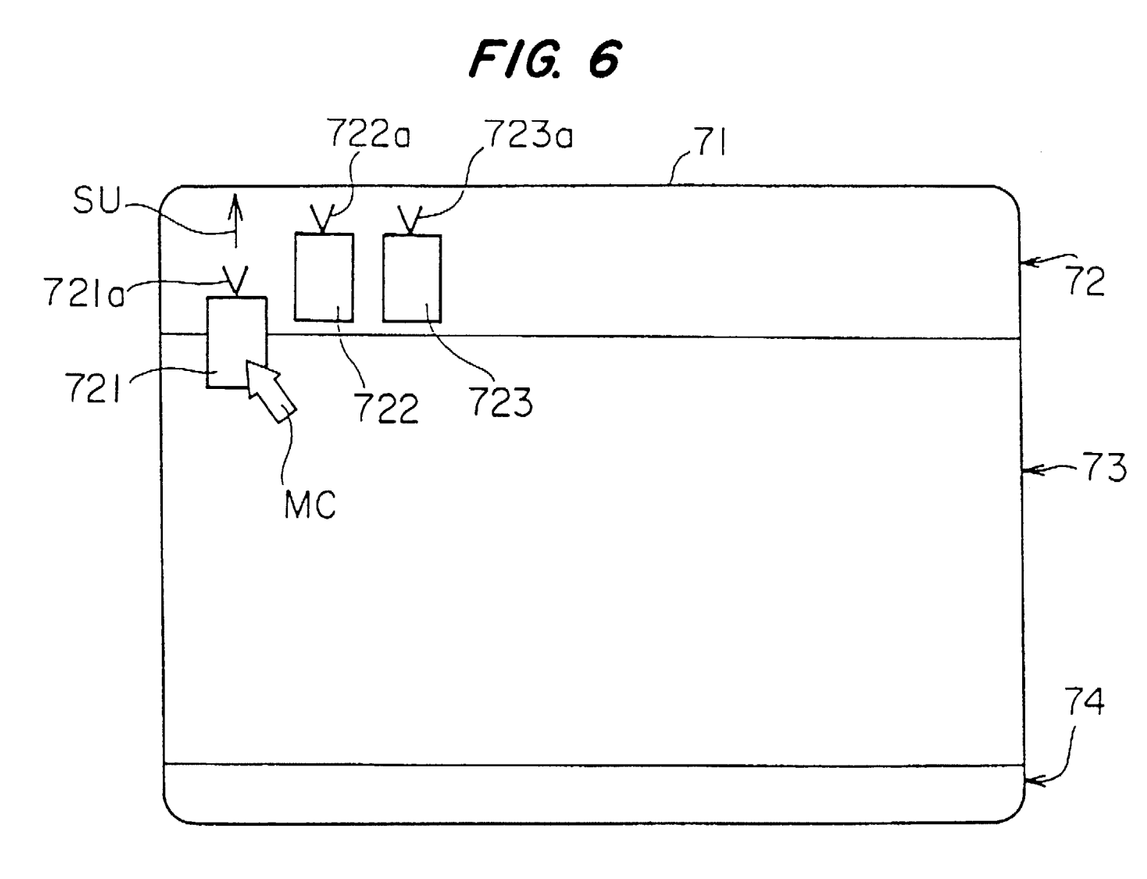
FIG. 6 is a view of a display screen, illustrating a state in which a bookmark is affixed to document information.
Figure 7:
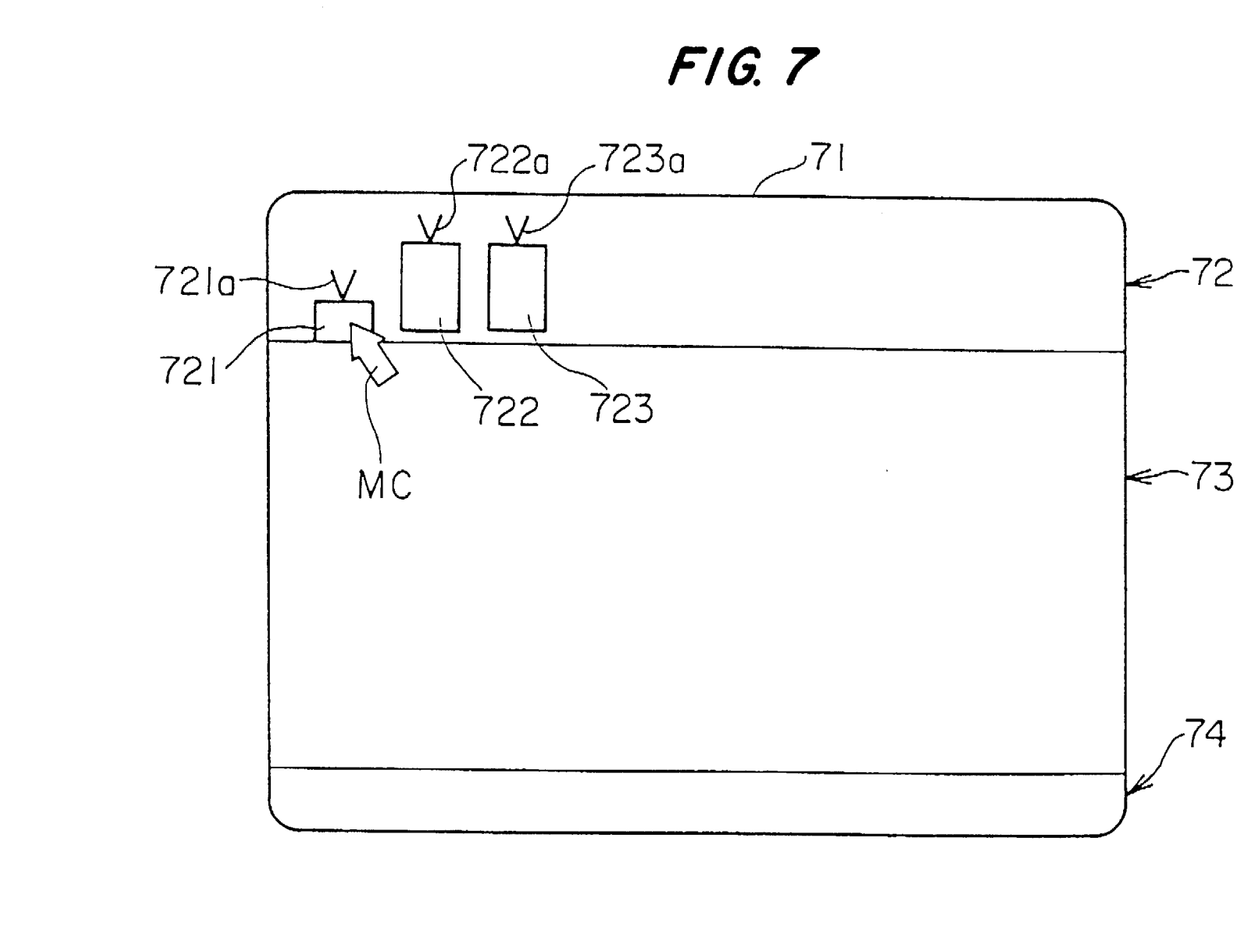
FIG. 7 is a view of a display screen, illustrating a state in which another part of the document information is displayed after the bookmark is affixed to the document information.
Figure 8:
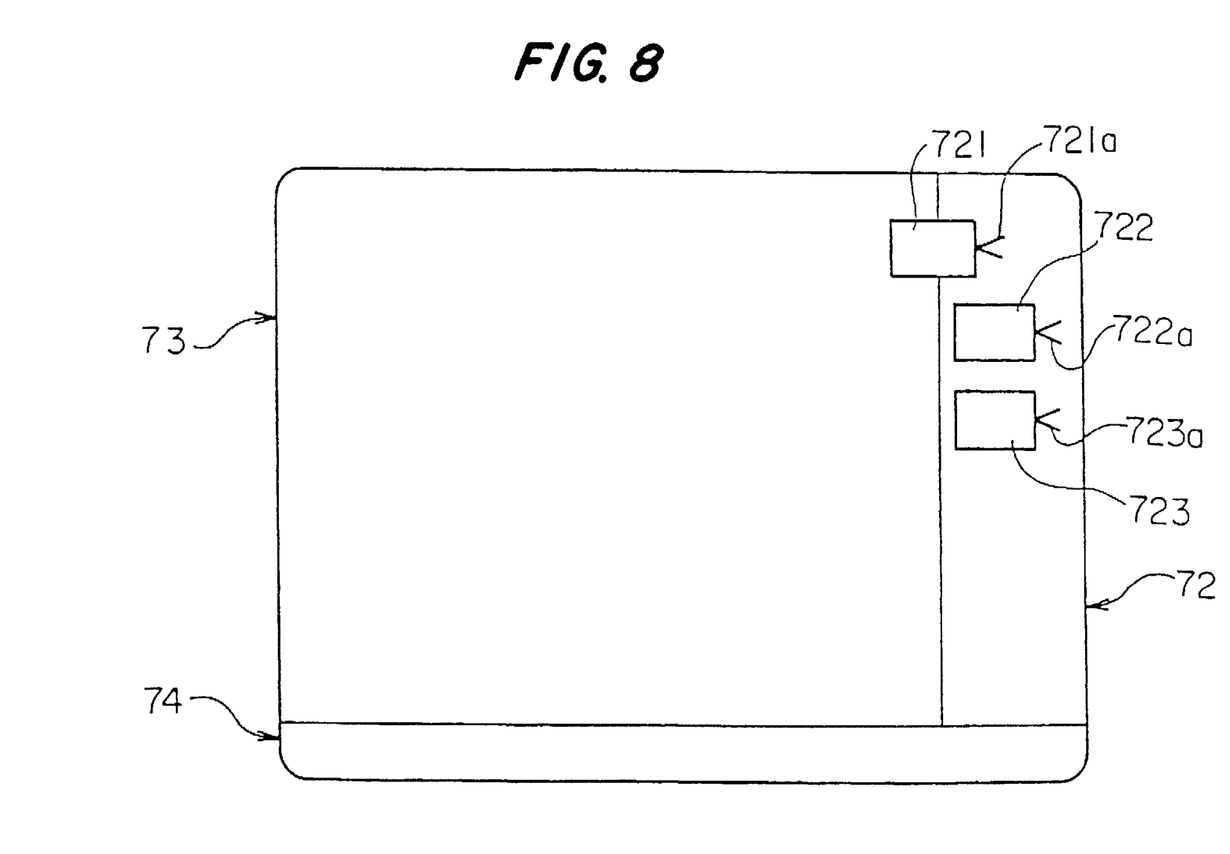
FIG. 8 is a view showing another example of display screen in which document information is displayed with a bookmark affixed thereto.

FIGS. 5, 6 and 7 each illustrate an example of a display screen showing the contents of document information, wherein FIG. 5 illustrates a normal display screen, FIG. 6 illustrates a state of display screen in which a bookmark is affixed to the document information, and FIG. 7 illustrates a state of display screen in which another part of the document information is displayed.

As shown in FIG. 5, the display screen 71 is split into three display sections, i.e., a bookmark display section 72, a document information display section 73, and a message display section 74 from the top of the display screen 71. Also displayed in the display screen 71 is a mouse cursor MC, by means of which the add command ADD, the select command SEL and the delete command DEL are output.

Bookmarks 721, 722 and 723 are displayed in the bookmark display section 72. The bookmarks 721, 722 and 723 are each in the form of a rectangle, and V-shaped ribbons 721a, 722a and 723a are attached to upper shorter sides of the respective rectangles. Each of the bookmarks 721, 722 and 723 can be displayed in a different color or with other attributes so that whether the bookmark concerned is used or unused, i.e., whether the bookmark is affixed to any document information, can be discriminated.

In the document information display section 73, a certain amount of the document information 21 corresponding to, e.g., one page, is displayed through a predetermined operation by the operator of the document processing apparatus 100 shown in FIG. 3. The predetermined operation includes, for example, displaying a pull-down menu and selecting a predetermined one of items from the displayed menu with the mouse 110.

In the message display section 74 are displayed various messages from the document processing apparatus 100 to the operator, for example, an error message, or a message necessary for the operation such as warning or a prompt for command entry.

An operation procedure for affixing the bookmark 721 to the document information displayed in the document information display section 73 will be now explained.

First, using a scroll key on the KEY 107 shown in FIG. 3, the document information displayed on the screen is appropriately scrolled up or down or to the right or left, such that an information location to which the bookmark 721 is to be affixed is located at the uppermost part of the document information display section 73.

The mouse cursor MC is then moved to the rectangular body of the bookmark 721, as shown in FIG. 5, and a button of the mouse 110 (FIG. 3) for outputting the add command ADD is pressed. As a result, the bookmark 721 in the bookmark display section 72 slides down on the display screen 71 in direction SD, such that the bookmark 721 is situated across the boundary between the bookmark display section 72 and the document information display section 73, as shown in FIG. 6. The display of FIG. 6 shows a state in which the bookmark 721 is affixed to the document information. If the screen is scrolled from the state 71 shown in FIG. 6 such that the information location to which the bookmark 721 has been affixed is shifted from the uppermost part to some other part of the document information display screen 73, then the display screen turns into a state shown in FIG. 7. The add command ADD can be output with respect not only to the bookmark 721, but also to the bookmarks 722 and 723.

When the add command ADD is output, the identification mark affixing means 30 (FIG. 2) in the document processing apparatus 100 sets the block number 22a, offset position 22b, relative line number 22c and status data 22d (FIG. 4) associated with the document information displayed at the uppermost part of the document information display section 73, and stores the set data in the RAM 103 (FIG. 3) as the identification mark information 22.

Next, a procedure for removing the bookmark 721, which is already affixed to the document information displayed in the document information display section 73, will be explained.

First, using a scroll key on the KEY 107 shown in FIG. 3, the display screen is changed into a state in which the bookmark 72 is displayed across the boundary between the bookmark display section 72 and the document information display section 73, as shown in FIG. 6.

The mouse cursor MC is then moved to the body of the bookmark 721, and a button of the mouse 110 (FIG. 3) for outputting the delete command DEL is pressed. As a result, the bookmark 721 slides up on the display screen 71 in direction SU, and the bookmark 721 is displayed in the manner shown in FIG. 5. The display of FIG. 5 illustrates a state in which the bookmark 721 is removed from the document information. The delete command DEL can be output with respect not only to the bookmark 721 but also to the bookmarks 722 and 723, as in the case of the add command ADD. Further, the button of the mouse 110 for outputting the delete command DEL may be the same as that used for outputting the add command ADD, as described later.

When the delete command DEL is output, the identification mark deleting means 40 (FIG. 2) in the document processing apparatus 100 operates to delete the information location data corresponding to the bookmark 721, from the identification mark information 22 stored in the RAM 103 (FIG. 3).

In this manner, the add command ADD and the delete command DEL are output with respect to the identification mark displayed on the screen 71, and accordingly, the bookmark can be visually affixed or removed as if a bookmark is placed in or removed from an ordinary book, whereby the visibility is enhanced.

The following is a description of how a portion of the document information corresponding to the information location, to which the bookmark 721 is already affixed, is displayed in the document information display section 73, and how the position of the bookmark 721 is moved within the document information.

First, suppose that the document information display section 73 of the display screen 71 in FIG. 7 displays a screen different from that displayed in the display section 73 of FIG. 6. Further, in FIGS. 6 and 7, it is assumed that the bookmark 721 is already affixed to an identical information location of the same document information. In this case, the lower part of the rectangular body of the bookmark 721 is hidden, as shown in FIG. 7.

The display of FIG. 7 appears when the operator enters a command to display another page of document information while the document information is displayed in the display section 73 of FIG. 6, or when the operator enters a command to display another document information stored in the external storage device 105 in FIG. 3.

To display part of document information corresponding to the information location to which the bookmark 721 is affixed, first, the mouse cursor MC is moved to the body of the bookmark 721, and a button of the mouse 110 (FIG. 3) for outputting the select command SEL is pressed. As a result, the display screen turns into a screen as shown in FIG.

6, in which the information location affixed with the bookmark 721 is located at the uppermost part of the document information display section 73. The button for outputting the select command SEL may be the same as that used for outputting the add command ADD, as described later.

When the select command SEL is output, the identification mark searching means 50 (FIG. 2) in the document processing apparatus 100 searches the identification mark information 22 in the RAM 103 (FIG. 3) for the information location corresponding to the bookmark 721, and supplies the block number 22a, offset position 22b, relative line number 22c and status data 22d, associated with the information location searched for, to the display control means 60 in FIG. 2. The display control means 60 then displays data in the document information 21 corresponding to the information location, in the document information display section 73 shown in FIG. 6.

To move the bookmark 721 within the document information, first, a new information location to which the bookmark 721 is to be affixed is situated at the uppermost part of the document information display section 73. While in this state, the mouse cursor MC is moved to the body of the bookmark 721, and a button of the mouse 110 (FIG. 3) for outputting a move command is pressed. The move command is such a command that, when the move command button is pressed, the delete command DEL and then the add command ADD are sequentially output from the mouse 110.

As a result, the bookmark 721 is moved from the previous information location to the new information location, and a screen as shown in FIG. 6 is displayed.

In this case, the identification mark deleting means 40 (FIG. 2) first operates in the document processing apparatus 100, to delete the information location data corresponding to the bookmark 721, from the identification mark information 22 stored in the RAM 103 shown in FIG. 3. Subsequently, the identification mark affixing means 30 sets the block number 22a, offset position 22b, relative line number 22c and status data 22d associated with the new information location, and stores the set data in the RAM 103 (FIG. 3) as the identification mark information 22.

Thus, only a simple operation is required to display information corresponding to the information location affixed with the bookmark, as if a particular page of an ordinary book can be found with the aid of a bookmark, and also a specific line at which the bookmark is affixed can be identified on the display screen. Further, the position of the bookmark can be easily changed within the document information.

Furthermore, whether the bookmark is used or unused can be determined at a glance by the color or attribute thereof.

The mouse 110 may be so designed that the add command ADD, delete command DEL and select command SEL can be output through operation of a predetermined single button, for example, a left button. One of the three commands to be enabled by the single button can be specified by recognizing the relationship between the document information displayed on the display screen 71 and the information location specified by the bookmark 721, 722 or 723. More specifically, when an unused bookmark is specified by the button as shown in FIG. 5, the add command ADD is executed. When the bookmark specified by the button is in use and at the same time the information location of the identification mark information 22 corresponding to the bookmark is situated at the uppermost part of the document information display section 73 as shown in FIG. 6, the delete command SEL is executed upon depression of the button.

When the specified bookmark is in use and the information location of the identification mark information 22 corresponding to the bookmark is not located at the uppermost part of the document information display section 73 as shown in FIG. 7, the select command SEL is executed upon depression of the button. Using the single button facilitates the operation.

In the above embodiment, the add command ADD is executed when the button of the mouse 110 for outputting the add command ADD is pressed. Alternatively, the add command ADD may be executed by first positioning the mouse cursor MC at the body of a bookmark in the bookmark display section 72, pressing the button of the mouse 110, and then dragging the mouse in the direction SD with the button held down. Similarly, the delete command DEL may be executed by positioning the mouse cursor MC at the body of a used bookmark, pressing the button of the mouse 110, and then dragging the mouse in the direction SU.

Further, in the foregoing embodiment, the display screen is slit into three horizontal sections, i.e., the bookmark display section 72, the document information display section 73, and the message display section 74 from top of the screen. The present invention is not limited to such screen layout, and a screen layout shown in FIG. 8, for example, may be employed, wherein the bookmark display section 72 is located at the right-hand side of the screen, the message display section 74 is located at the bottom of the screen, and the document information display section 73 occupies a major area of the screen, extending from the upper left corner over to the central part thereof. With the illustrated screen layout, the bookmarks 721, 722 and 723 can be easily affixed to three successive lines of the document information displayed in the document information display section 73.

Instead of the command entry means 10 shown in FIG. 2, a pad may be used. In the following, a schematic arrangement of the pad serving as the command entry means 10 and a procedure for operating the pad will be described.

Figure 9:
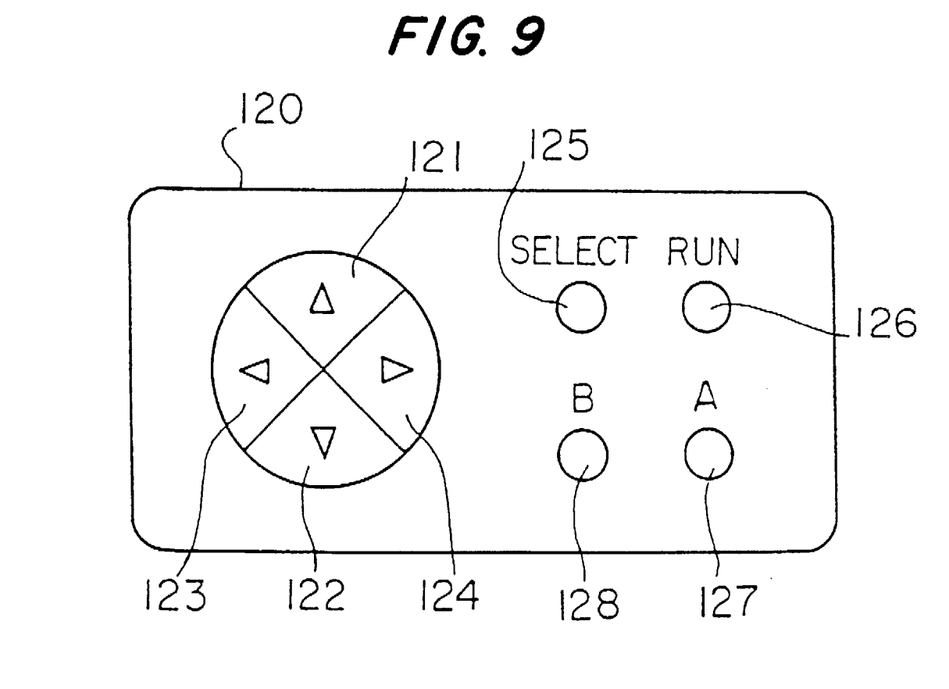
FIG. 9 is a view illustrating the schematic arrangement of a pad.

FIG. 9 schematically illustrates the arrangement of the pad. As shown in the figure, the pad 120 comprises various elements including an up command button 121, a down command button 122, a left command button 123, a right command button 124, a mode selection button (SELECT) 125, an execute (RUN) button 126, a process button (A) 127, and a process button (B) 128.

The mode selection button 125 is used to enter a command to move a command cursor (not shown), corresponding to the mouse cursor MC, between the bookmark display section 72 and the document information display section 73, and a mode is specified according to the position of the command cursor with respect to the display section. The execute button 126 is used to execute a predetermined command involving two or more procedures; namely, it provides the aforementioned move command made up of the delete command DEL and the add command ADD subsequent thereto. The process button 127 is used to input an "execute" command to the document processing apparatus 100, and the process button 128 is used to enter a "cancel" command to cancel a previous command.

The up command button 121 provides different functions in accordance with the mode specified by the mode selection button 125. Namely, the up command button 121 serves as a button for deleting the selected bookmark (i.e., the button for outputting the delete command DEL) when positioned in the bookmark display section 72, and serves as a button for scrolling the display screen upward when positioned in the document information display section 73.

Similarly, the down command button 122 provides different functions in accordance with the mode specified by the mode selection button 125. Namely, the down command button 122 serves as a button for affixing the selected bookmark (i.e., the button for outputting the add command ADD) when positioned in the bookmark display section 72, and serves as a button for scrolling the display screen downward when positioned in the document information display section 73.

Also, the left command button 123 provides different functions in accordance with the mode specified by the mode selection button 125. Namely, the left command button 123 serves as a button for selecting a bookmark located to the left of the currently selected bookmark (i.e., the button for outputting the select command SEL) when positioned in the bookmark display section 72, and serves as a button for displaying a preceding page of the currently displayed screen when positioned in the document information display section 73. If there is no bookmark located to the left of the currently selected bookmark, the rightmost bookmark on the display screen 71 is selected.

Similarly, the right command button 124 provides different functions in accordance with the mode specified by the mode selection button 125. Namely, the right command button 124 serves as a button for selecting a bookmark located to the right of the currently selected bookmark (i.e., the button for outputting the select command SEL) when positioned in the bookmark display section 72, and serves as a button for displaying a subsequent page of the currently displayed screen when positioned in the document information display section 73. If there is no bookmark located to the right of the currently selected bookmark, the leftmost bookmark on the display screen 71 is selected.

By using the pad 120 in which buttons are arranged in a manner suited for entering commands to the document processing apparatus 100, instead of the general-purpose mouse 110, the operation can be further simplified and the operability enhanced.

Although in the above embodiment, the mouse 110 or the pad 120 (FIG. 9) is used as the command entry means 10, the command entry means is not limited to such devices and other pointing devices, e.g., a trackball, electronic pen or tablet, may be used for entering commands.

Further, the bookmarks 721, 722 and 723 of the above embodiment, each serving as the identification mark, have the shape of a ribboned card, but the shape of the book mark is not limited to such a shape and may be any desired figure that can be readily distinguished by the operator of the document processing apparatus 100, such as a circle or triangle.

Furthermore, the number of bookmarks displayed on the display screen 71 as the identification marks is not limited to three. For example, the number of identification marks may be increased or decreased freely as required by the operator of the document processing apparatus 100 through a predetermined operation.

In the above embodiment, the document information 21 is stored in the external storage device 105 including a compact disk. Alternatively, a hard disk drive, magneto-optic disk drive or the like may be used as the external storage device so that the document information 21 can be stored in a hard disk, magneto-optic disk, etc. In this case, the access speed can be increased.

In the foregoing embodiment, moreover, the identification mark information 22 is stored in the RAM 103, but may alternatively be stored in the nonvolatile memory 104, or an external storage device including a hard disk drive, magneto-optic disk drive or the like. In this case, even in the event an accident such as when a power failure occurs, the identification mark information 22 can be retained, and thus a state immediately before the occurrence of the accident, i.e., a state in which the identification marks are affixed to the document information 21, can be readily restored.

As described above, according to the present invention, the identification mark affixing means causes the storage means to store identification mark information when supplied with an add command from the command entry means, the identification mark searching means searches the identification mark information for an information location when supplied with a select command from the command entry means, and the display control means displays both document information and identification mark at the display device based on the document information and the identification mark information stored in the storage means, whereby the location in the document information at which the identification mark such as a bookmark is affixed can be recognized at a glance, thus improving the visibility. Accordingly, whether the identification mark is used or unused can be readily determined, and the identification mark such as a bookmark can be visually placed in document information and also freely referred to, as in the case of putting a bookmark in an ordinary book.

Further, the use of the pointing device, e.g., a pad or mouse, as the command entry means facilitates the addition, selection, etc. of the identification mark, thereby enhancing the ease of operation.

The foregoing is considered as illustrative only of the principles of the present invention. Further, since numerous modifications and changes wilt readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A document processing apparatus including a display device for displaying document information of a page including a plurality of lines on the display device, comprising:

a storage device to store information;

command generating means for generating an add command to affix an identification mark to a desired line in a desired page of the document information displayed on the display device, and for generating a select command to select a desired one of a plurality of affixed identification marks;

identification mark affixing means, in response to receiving said add command, for causing said storage device to store the desired line in the desired page to which the identification mark is to be affixed as identification mark information;

identification mark searching means, in response to receiving said select command, for searching the identification mark information stored in the storage device for the desired line in the desired page corresponding to the selected one affixed identification mark; and display control means for displaying the identification mark affixed to the desired line in the desired page of the document information at a particular position on a screen of the display device, based on the add command generated by the command generating means or the identification mark information searched for by said identification mark searching means in response to said select command, for moving the identification mark displayed on the display device from an outside to an inside of a display section for the document information in response to receiving the add command, and for displaying a ribbon-card shade as the identification mark on the display device.

2. The document processing apparatus according to claim 1, wherein said command generating means further generates a delete command to delete a desired one of the plurality of affixed identification marks, and the document processing apparatus further comprises identification mark deleting means, in response to receiving said delete command, for deleting a desired line in a desired page corresponding to the affixed identification mark to be deleted, from the identification mark information.

3. The document processing apparatus according to claim 2, wherein at the time that the delete command and the add command are entered in sequence from the command entry means and a desired one of the affixed identification marks and a desired line in a desired page of the document information displayed on the display device are specified, the identification mark deleting means and the identification mark affixing means further move the specified identification mark from the previous desired line in the desired page to the new desired line in the desired page.

4. The document processing apparatus according to claim 3, wherein said display control means moves the specified identification mark to the desired new line in the desired page in response to receiving the delete command and the add command in sequence.

5. The document processing apparatus according to claim 1, wherein said command generating means includes a mouse having a button, said mouse outputting the add command by pressing the button after positioning a mouse cursor at a body of the identification mark.

6. The document processing apparatus according to claim 1, wherein said command generating means includes a mouse having a button, said mouse outputting the add command by pressing the button and then dragging said mouse after positioning a mouse cursor at a body of the identification mark.

7. A document processing apparatus including a display device for displaying document information including a plurality of lines on the display device, comprising:

a storage device to store information;

command generating means for generating an add command to affix an identification mark to a desired line of the document information displayed on the display device, and for generating a select command to select a desired one of a plurality of affixed identification marks;

identification mark affixing means, in response to receiving said add command, for causing said storage device to store the desired line to which the identification mark is to be affixed as identification mark information;

identification mark searching means, in response to receiving said select command, for searching the identification mark information stored in the storage device for the desired line corresponding to the selected one affixed identification mark; and display control means for displaying the identification mark affixed to the desired line of the document information at a particular position on a screen of the display device, based on the add command generated by the command generating means or the identification mark information searched for by said identification mark searching means in response to the select command.

8. A document processing apparatus including a display device for displaying document information of a page including a plurality of lines on the display device, comprising:

a storage device to store information;

command generating means for generating an add command to affix an identification mark to a desired line in a desired page of the document information displayed on the display device, for generating a select command to select a desired one of a plurality of affixed identification marks, and for generating a delete command to delete desired one of the plurality of affixed identification marks;

identification mark affixing means, in response to receiving said add command, for causing said storage device to store the desired line in the desired page to which the identification mark is to be affixed as identification mark information;

identification mark searching means, in response to receiving said select command, for searching the identification mark information stored in the storage device for the desired line in the desired page corresponding to the selected one affixed identification mark;

display control means for displaying the identification mark affixed to the desired line in the desired page of the document information at a particular position on a screen of the display device, based on the add command generated by the command generating means or the identification mark information searched for by said identification mark searching means in response to said select command, and for moving the identification mark displayed on the display device from an inside to an outside of a display section for the document information in response to receiving the delete command; and identification mark deleting means, in response to receiving said delete command, for deleting a desired line in a desired page corresponding to the affixed identification mark to be deleted, from the identification mark information.

9. The document processing apparatus according to claim 8, wherein at the time that the delete command and the add command are entered in sequence from the command entry means and a desired one of the affixed identification marks and a desired line in a desired page of the document information displayed on the display device are specified, the identification mark deleting means and the identification mark affixing means further move the specified identification mark from the previous desired line in the desired page to the new desired line in the desired page.

10. The document processing apparatus according to claim 9, wherein said display control means moves the specified identification mark the desired new line in the desired page in response to receiving the delete command and the add command in sequence.

11. The document processing apparatus according to claim 8, wherein said command generating means includes a mouse having a button, said mouse outputting the add command or the delete command by pressing the button after positioning a mouse cursor at a body of the identification mark.

12. The document processing apparatus according to claim 8, wherein said command generating means includes a mouse having a button, said mouse outputting the add command or the delete command by pressing the button and then dragging said mouse after positioning a mouse cursor at a body of the identification mark.

13. A document processing apparatus including a display device for displaying document information of a page including a plurality of lines on the display device, comprising:

a storage device to store information;

command generating means for generating an add command to affix an identification mark to a desired line in a desired page of the document information displayed on the display device, and for generating a select command to select a desired one of a plurality of affixed identification marks, said command generating means including a control pad having various elements including an up command button, a down command button, a left command button, a right command button, a mode selection button, an execution button, a first process button, and a second process button, said various elements being arranged in a manner suited for entering commands to said document processing apparatus;

identification mark affixing means, in response to receiving said add command, for causing said storage device to store the desired line in the desired page to which the identification mark is to be affixed as identification mark information;

identification mark searching means, in response to receiving said select command, for searching the identification mark information stored in the storage device for the desired line in the desired page corresponding to the selected one affixed identification mark; and display control means for displaying the identification mark affixed to the desired line in the desired page of the document information at a particular position on a screen of the display device, based on the add command generated by the command generating means or the identification mark information searched for by said identification mark searching means in response to said select command.

* * * * *